(12) United States Patent
Lee

(10) Patent No.: US 12,262,121 B2
(45) Date of Patent: Mar. 25, 2025

(54) PRESENTER HAVING HEAD PART TO CONTROL SHOOTING DIRECTION

(71) Applicant: Yonggoo Lee, Chungcheongnam-do (KR)

(72) Inventor: Yonggoo Lee, Chungcheongnam-do (KR)

(73) Assignee: Yonggoo Lee, Chungcheongnam-do (KR)

( * ) Notice: Subject to any disclaimer, the term of this patent is extended or adjusted under 35 U.S.C. 154(b) by 195 days.

(21) Appl. No.: 18/013,318

(22) PCT Filed: May 4, 2021

(86) PCT No.: PCT/KR2021/005588
§ 371 (c)(1),
(2) Date: Dec. 28, 2022

(87) PCT Pub. No.: WO2022/030731
PCT Pub. Date: Feb. 10, 2022

(65) Prior Publication Data
US 2023/0269476 A1      Aug. 24, 2023

(30) Foreign Application Priority Data

Aug. 4, 2020  (KR) .......................... 10-2020-0097170
Sep. 3, 2020  (KR) .......................... 10-2020-0112633

(51) Int. Cl.
*H04N 23/695* (2023.01)
*G03B 21/132* (2006.01)
*G03B 21/14* (2006.01)
*H04N 23/50* (2023.01)

(52) U.S. Cl.
CPC .......... *H04N 23/695* (2023.01); *G03B 21/132* (2013.01); *G03B 21/145* (2013.01); *H04N 23/50* (2023.01)

(58) Field of Classification Search
CPC .... G03B 21/145; G03B 21/132; G03B 17/17; G03B 17/561; H04N 23/50; H04N 23/695; H04N 9/3176
See application file for complete search history.

(56) References Cited

U.S. PATENT DOCUMENTS 6,975,353 B1 *  12/2005  Milinusic ............. H04N 23/631
                                                                348/262
2018/0362183 A1 *  12/2018  Lorell .................. G03B 17/561

FOREIGN PATENT DOCUMENTS

JP     2004032465 A  *  1/2004  ......... G06F 3/03545
KR  20230032689 A  *  3/2023  ........... G03B 21/145

* cited by examiner

*Primary Examiner* — Christopher E Mahoney

(57) ABSTRACT

Disclosed herein is provided is a visual presenter having a head structure capable of changing a photographing direction, the visual presenter including a base fixed to a floor by applying weight to prevent the presenter from falling down, a head part having one end provided with a camera lens facing the floor, a support part connecting the head part and the base and extending upward from the base to position the head part at a height of a learner's face, and a photographing mode switching module disposed adjacent to the camera lens and configured to switch between a learner photographing mode and a study material photographing mode without requiring manipulation of the head part.

9 Claims, 6 Drawing Sheets

PRIOR ART

PRESENTER HAVING HEAD PART TO CONTROL SHOOTING DIRECTION

CROSS-REFERENCE TO RELATED APPLICATIONS

This application is a 371 National Phase of International Patent Application No. PCT/KR2021/005588, filed on May 4, 2021, which claims priority to Korean Application No. 10-2020-0112633, filed on Sep. 3, 2020 and titled "PRESENTER HAVING HEAD PART TO CONTROL SHOOTING DIRECTION", the contents of which are incorporated herein its entirety.

TECHNICAL FIELD

The present disclosure relates to a visual presenter, and more particularly, to a visual presenter having a head structure capable of easily changing a photographing direction such that photographing may be performed while changing study materials and learners according to situations.

BACKGROUND ART

Recently, online lectures have been activated since the breakout of coronavirus pandemic. However, it is difficult to realize interaction during lectures. As a result, students are often distracted or lose concentration during lectures, resulting in a decrease in academic achievement.

In order to address this issue, a visual presenter that allows teachers and students to communicate by alternately viewing each other's faces and learning materials as well as lecture materials is needed.

However, the visual presenter is generally used to take images of objects on the desk. Accordingly, when the front side is photographed in the middle of photographing an object on the desk, the image of the object is formed upside down. Therefore, in order to see the correctly displayed face image of the other party, a hardware-related method of rotating a head portion by 180° or a software-related method of embedding a program capable of vertically inverting the output image should be used in photographing the front side (see Korean Published Application No. 10-0497519 and Korean Published Application No. 10-0377984).

However, with such conventional methods, it is difficult to distribute visual presenters to students at home due to the increase in costs of the devices. Further, it is difficult for young students such as elementary school students in lower grades to correctly operate a device in a complex structure. Therefore, there is a need for a device that can be operated intuitively and simply.

In order to address such issues, much time and money are being spent on related research.

DISCLOSURE

Technical Problem

Therefore, the present disclosure has been made in view of the above problems, and it is one object of the present disclosure to provide a popular type of visual presenter which a user may easily and correctly switch to a learner photographing mode and a study material photographing mode with a simple operation.

It is another object of the present disclosure to provide a detachable photographing mode switching module that may be mounted on a conventional visual presenter to facilitate switching between a learner photographing mode and a study material photographing mode.

Objects that can be achieved by the present disclosure are not limited to those mentioned above, and other objects of the present disclosure will become apparent to those of ordinary skill in the art from the embodiments of the present disclosure described below.

Technical Solution

In accordance with one aspect of the present disclosure, provided is a visual presenter having a head structure capable of changing a photographing direction, the visual presenter including a base fixed to a floor by applying weight to prevent the presenter from falling down, a head part having one end provided with a camera lens facing the floor, a support part connecting the head part and the base and extending upward from the base to position the head part at a height of a learner's face, and a photographing mode switching module disposed adjacent to the camera lens and configured to switch between a learner photographing mode and a study material photographing mode without requiring manipulation of the head part.

In one embodiment of the present disclosure, the photographing mode switching module may include a rotating body configured to rotate between a study material photographing mode position and a learner photographing mode position, a reflective member disposed on a bottom surface of the rotating body, an angle control body disposed between the rotating body and the camera lens and having an inclined surface supporting the rotating body such that the rotating body remains inclined at a predetermined angle from the camera lens at the learner photographing mode position, and a hinge arranged between the angle control body and the rotating body and defining a rotation axis of the rotating body, wherein the rotating body may closely contact a head part member at the study material photographing mode position, wherein the rotating body may overlap a lower portion of the camera lens to form an image of an object disposed in front on the camera lens at the learner photographing mode position.

In one embodiment of the present disclosure, the rotating body may include a magnet disposed between the hinge and the reflective member, wherein the inclined surface may include a magnetic plate configured to fix the rotating body at the learner photographing mode position when contacting the magnet, wherein the head part member may include a magnetic member configured to fix the rotating body at the study material photographing mode position when contacting the magnet.

In one embodiment of the present disclosure, the angle control body may include a sensor configured to detect contact between the rotating body and the inclined surface.

In one embodiment of the present disclosure, the visual presenter may further include a controller configured to control an operation of the camera lens, wherein the controller may be configured to detect a signal from the sensor and horizontally invert a captured image from the camera lens.

In one embodiment of the present disclosure, the sensor may include a magnetic force sensor configured to detect a change in a magnitude of magnetic force formed between the magnet and the magnetic plate adjacent to each other.

In one embodiment of the present disclosure, the rotating body may be naturally fixed at the learner photographing mode position when a user releases the rotating body from the study material photographing mode position.

In one embodiment of the present disclosure, when an angle between the rotating body and the floor is smaller than when the rotating body is positioned perpendicular to the floor, the magnetic force of the magnet and the magnetic plate may be controlled to attract and fix the rotating body to the inclined surface. When the rotating body is separated from the head part member, damping of the hinge may be controlled such that the rotating body falls to a position perpendicular to the floor.

In one embodiment of the present disclosure, the sensor may include a pressure sensor configured to detect force applied by the magnet to the magnetic plate.

In one embodiment of the present disclosure, the photographing mode switching module may be detachably provided to the head part.

Advantageous Effects

According to the embodiments of the present disclosure, the following representative effects may be expected.

First, according to the present disclosure, a popular-type visual presenter may eliminate the need to embed separate software and have a simplified device structure that may be easily operated by young students such as elementary school students in low grades.

Second, a reflective member is mounted on the lower surface of the rotating body, and accordingly a user's face may be photographed without vertical inversion when positioned in the user photographing mode.

Third, in a photographing mode switching module, an angle control body having a predetermined inclination angle is disposed on the side opposite to the rotating body with respect to the hinge, and accordingly the position of the rotating body may be fixed in the user photographing mode.

Fourth, the rotating body is provided with a magnet. Accordingly, external force may be prevented from changing the position of the rotating body in each photographing mode and the rotating body may be easily fixed at the position of each photographing mode even with a small force.

Effects obtainable in the embodiments of the present disclosure are not limited to the above-mentioned effects, and other effects not mentioned may also be obtained by the embodiments of the present disclosure or a combination of embodiments.

BEST MODE

Figure 1A:
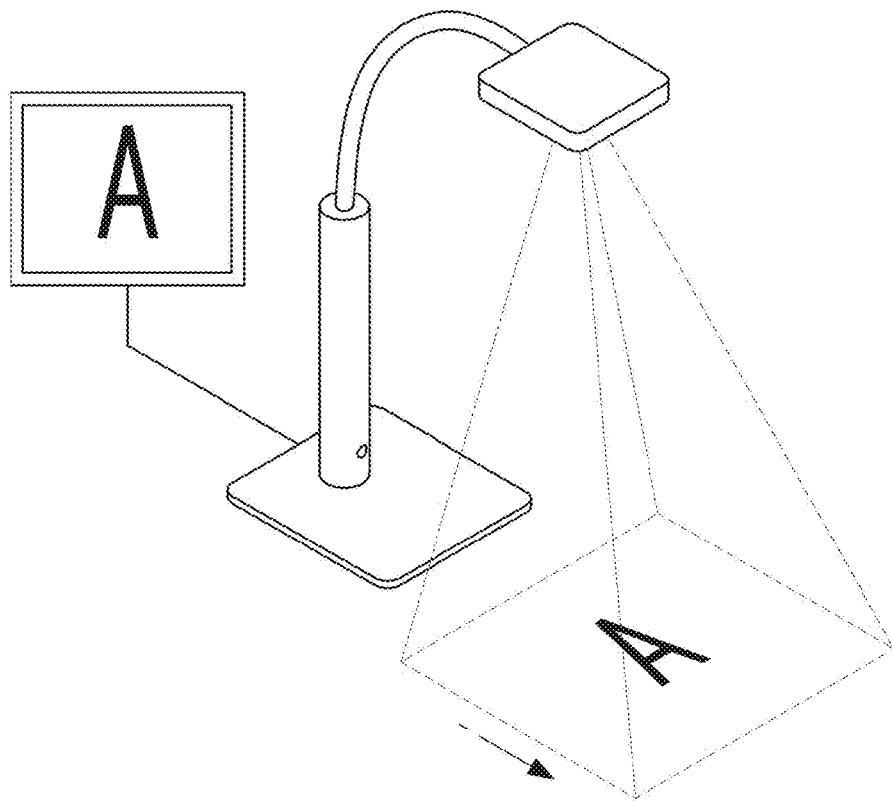
FIG. 1 is a view illustrating an issue related to a conventional visual presenter.
Figure 1B:
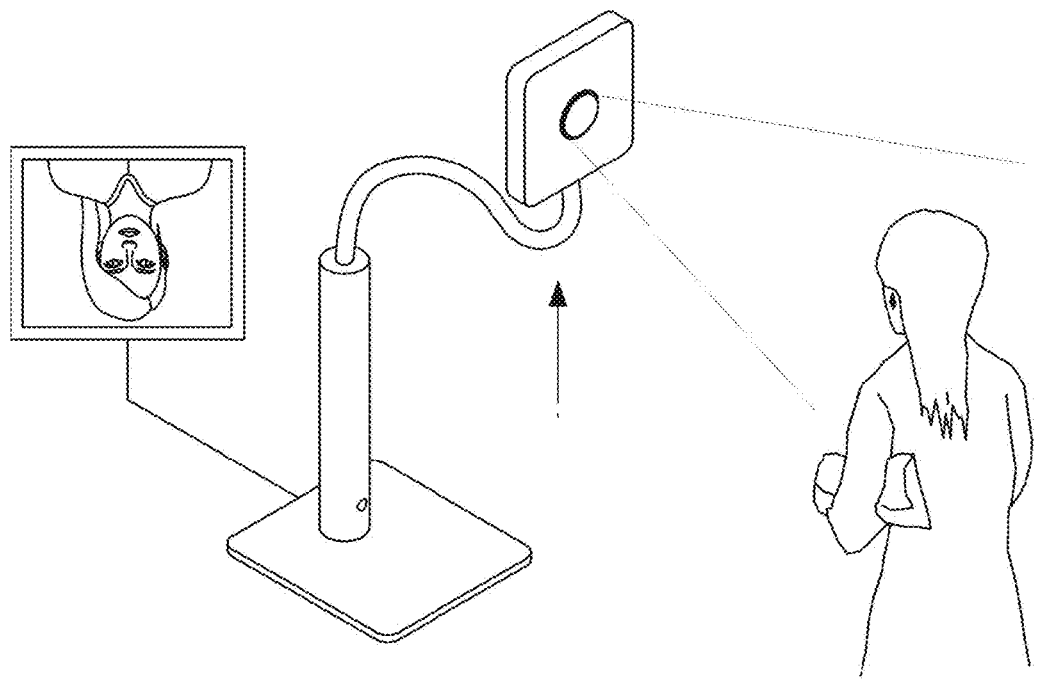

A visual presenter having a head structure capable of changing a photographing direction according to the present disclosure may have various modified embodiments.

In the present disclosure, some embodiments will be described in detail with reference to the accompanying drawings. However, the description is not intended to limit the present disclosure to specific embodiments. It should be understood that the present disclosure include all modifications, equivalents, or alternatives provided they come within the scope of the appended claims and their equivalents.

In the present disclosure, the same and similar components are assigned the same and similar reference numerals even in different embodiments, and the description thereof will be made only once. As used herein, a singular expression includes a plural expression unless the context clearly dictates otherwise.

As used herein, the suffix "module" or "unit" for elements is a term used for convenience of description and does not have any distinguishable meaning or function.

Figure 2:
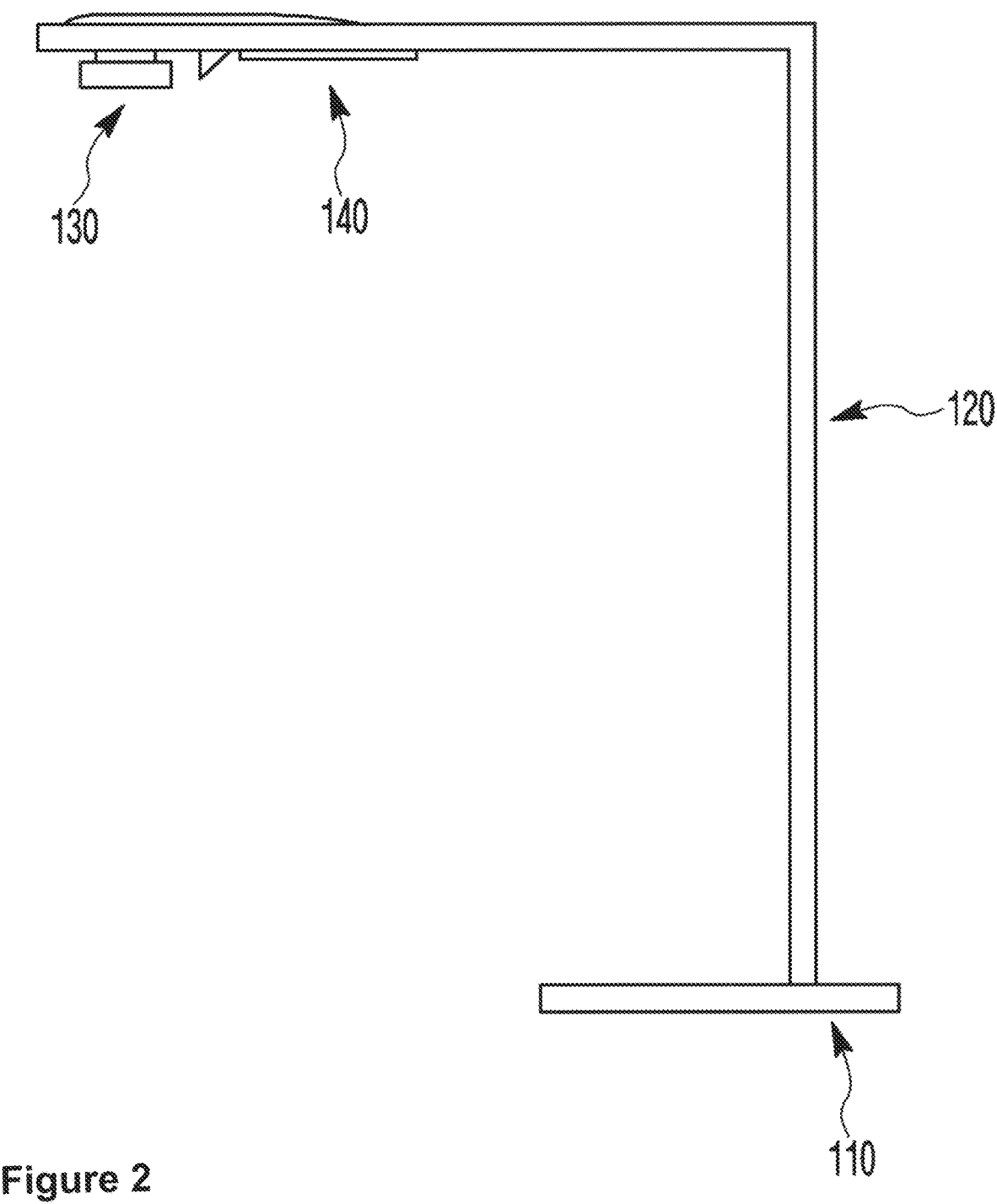
FIG. 2 is a conceptual view of a visual presenter having a head structure capable of changing a photographing direction according to an embodiment of the present disclosure.

FIG. 2 is a conceptual view of a visual presenter 100 having a head structure capable of changing a photographing direction according to an embodiment of the present disclosure.

Referring to FIG. 2, the visual presenter 100 may include a base 110, a support part 120, a head part 130, and a photographing mode switching module 140.

The base 110 may be configured to be fixed to a floor surface by applying weight such that the presenter does not fall down. A weight or the like may be mounted on the base 110 to lower the center of gravity.

The support part 120 connects the head part 130 and the base 110.

The support part 120 may extend upward from the base 110 such that the head part 130 is positioned at a specific height. That is, the support part 120 makes the head part 130 positioned at the height of a learner's face such that the learner's face may be photographed when the photographing mode switching module 140 is operated.

According to a preferred embodiment of the present disclosure, the visual presenter 100 is arranged on a desk and the learner sitting on a chair views study materials placed under the visual presenter 100.

At this time, the length of the support part 120 may be adjusted such that the head part 130 is disposed at a height similar to that of the learner's face in consideration of the learner's sitting height.

The head part 130 is configured to face the top surface of the desk.

According to one embodiment of the present disclosure, the head part 130 may be configured to move up and down as needed. That is, the distance from the top surface of the desk may be adjusted by changing the height of the head part 130 within a specific range.

A camera lens 133 configured to photograph study materials placed on the desk is mounted at one end of the head part 130.

The photographing mode switching module 140 may be fixed or detachably provided to the head part 130.

The photographing mode switching module 140 is disposed adjacent to the camera lens 133.

The photographing mode switching module 140 includes a rotating body 141 having one surface to which a reflective member 142 is attached, such that the user only needs to simply operate the photographing mode switching module 140 to switch between the learner photographing mode and the study material photographing mode without operating the head part 130.

Figure 3:
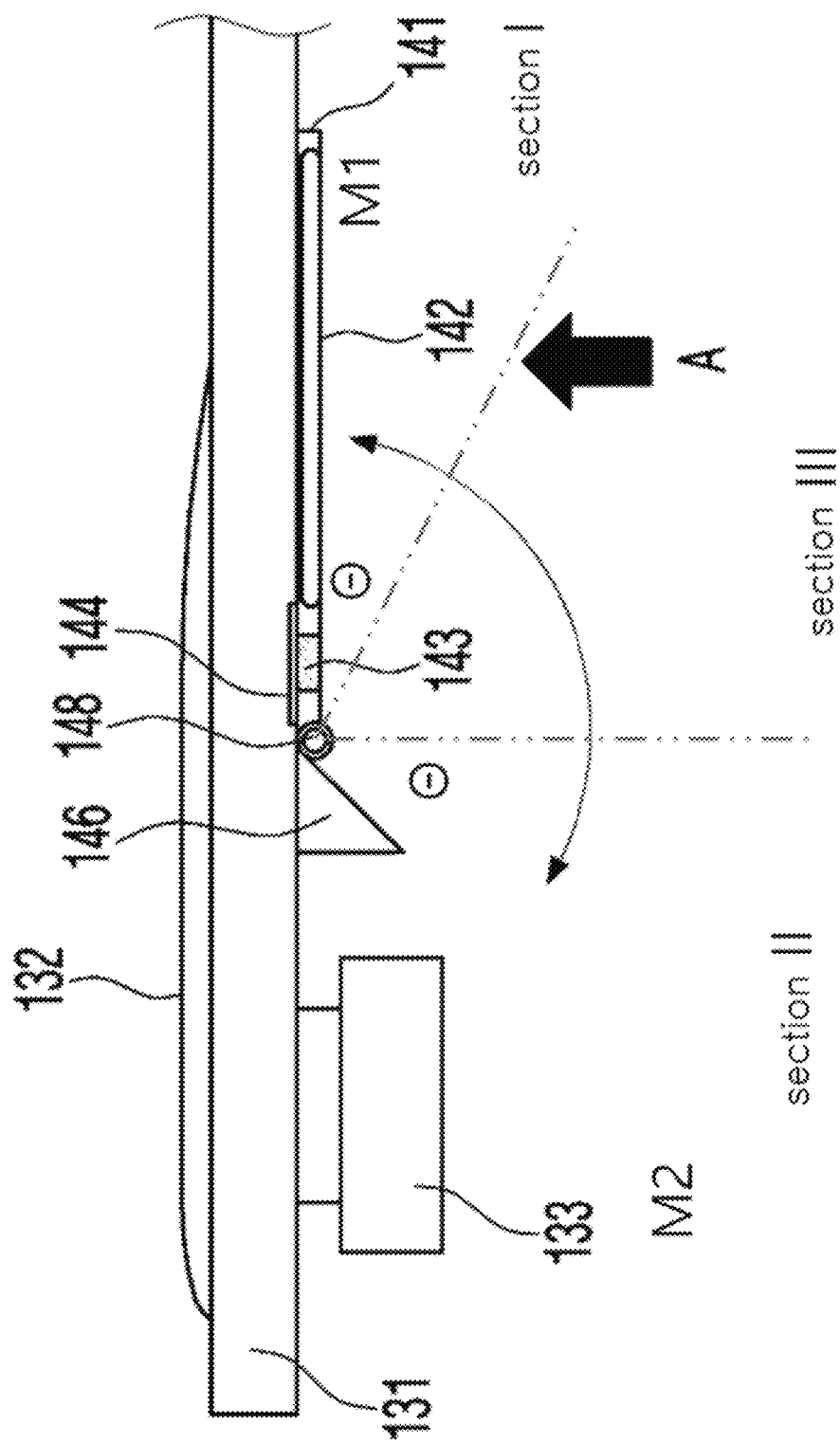
FIG. 3 is an enlarged conceptual view of the head structure illustrated in FIG. 2.
Figure 4:
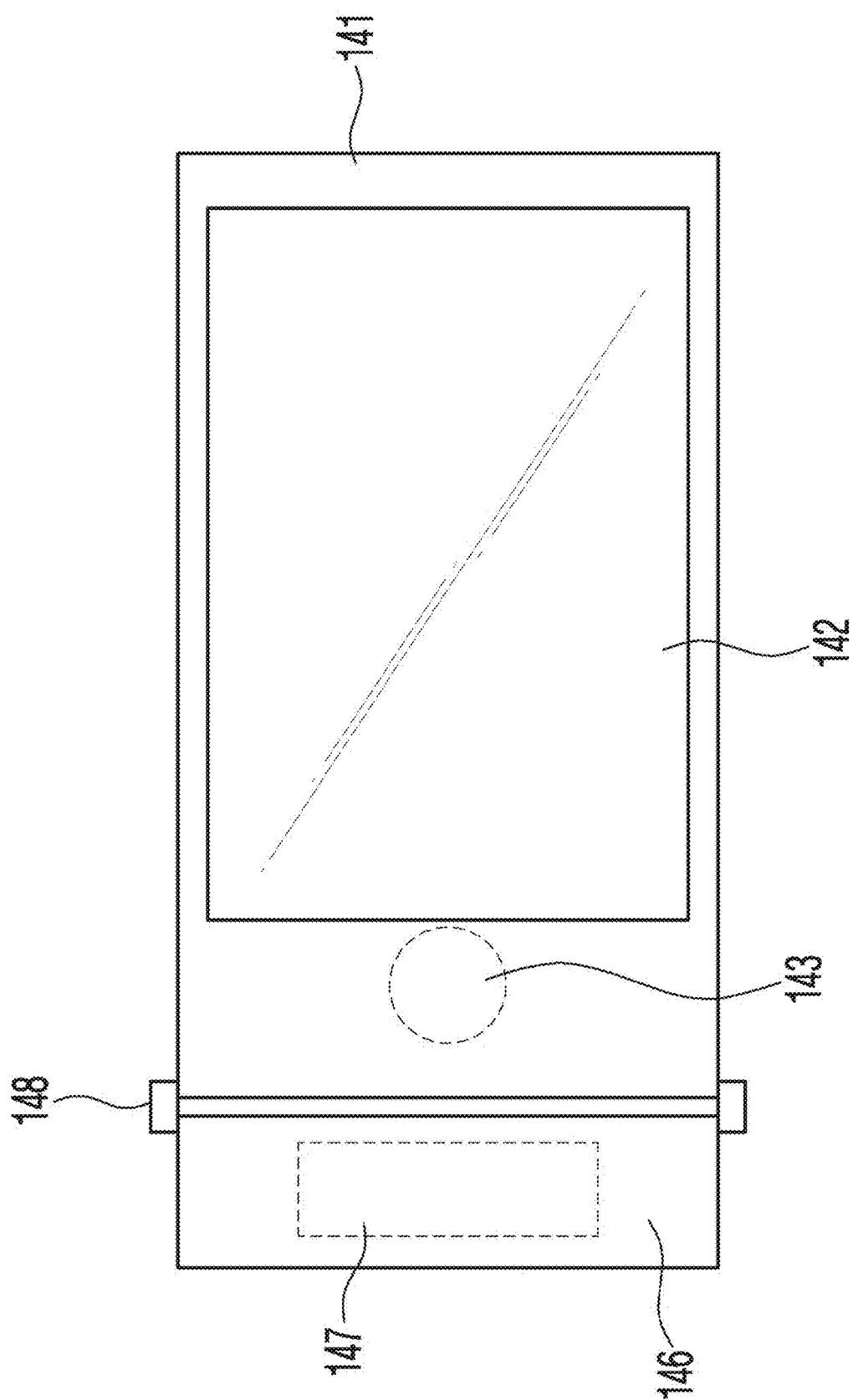
FIG. 4 is a conceptual view of the photographing mode switching module viewed in direction A in FIG. 3.

FIG. 3 is an enlarged conceptual view of the head structure shown in FIG. 2, and FIG. 4 is a conceptual view of the photographing mode switching module 140 viewed in direction A in FIG. 3.

Referring to FIGS. 3 and 4, the photographing mode switching module 140 is disposed adjacent to the camera lens 133. As shown in the figure, the photographing mode switching module 140 may include the rotating body 141, the reflective member 142, an angle control body 146, and a hinge 148.

The rotating body rotates between a study material photographing mode position, at which the rotating body closely contacts a head part member 131, and a learner photographing mode position, at which the rotating body overlaps the lower portion of the camera lens 133 to form an image of an object disposed in front on the camera lens 133.

The reflective member 142 is arranged on the bottom surface of the rotating body.

The reflective member 142 reflects the learner's image such that the camera lens 133 may photograph the learner's face located in front of the visual presenter 100 in the learner photographing mode.

The angle control body is disposed between the rotating body 141 and the camera lens 133.

One surface of the angle control body is in contact with the rotating body. The contact surface may form an oblique plane having a predetermined angle with respect to the head part member 131.

A magnet 143 may be disposed on the rotating body 141.

According to one embodiment of the present disclosure, the magnet 143 may be disposed adjacent to the rotation shaft of the rotating body 141. For example, as shown in FIG. 4, the magnet 143 may be disposed closer to the hinge 148 than to the reflective member 142.

The rotating body 141 may be fixed at the learner photographing mode position by the attractive force between the magnet 143 and the angle control body 146. In this regard, the angle control body may include a magnetic plate 145 facing the magnet 143.

The rotating body 141 may be fixed at the study material photographing mode position by the attractive force between the magnet 143 and the head part member 131. In this regard, the head part member 131 may include a magnetic member 144 facing the magnet 143.

The magnetic plate 145 and the magnetic member 144 are made of a material such as iron attractive to a magnet. According to another embodiment of the present disclosure, the magnetic plate 145 and the magnetic member 144 may be replaced with magnets. Similarly, the magnet 143 may be replaced with a magnetic material such as iron.

Referring to FIG. 4, the reflective member 142 is disposed on the bottom surface of the rotating body 141.

The reflective member 142 is formed of a member having high reflectivity such as a mirror.

As shown in the figure, the hinge 148 serves as an axis of rotation of the rotating body 141. That is, a hinge 148 is connected to one end of the rotating body 141.

The rotating body 141 is connected to one side of the rotation shaft and the angle control body 146 is connected to the opposite side.

A sensor 147 may be mounted on the angle control body 146. The sensor 147 detects that the rotating body 141 contacts the angle control body 146. In other words, the sensor 147 may detect a mode change according to a change in position of the rotating body 141 and transmit a signal to a controller 132.

The sensor 147 may be a magnetic force sensor 147 that detects a change in the magnitude of the magnetic force formed by the magnet 143 in contact with the magnetic plate 145, or a pressure sensor 147 that detects the pressure applied to the magnetic plate 145 by the magnet 143.

The controller 132 configured to control the operation of the camera lens 133 and image output may be provided on the head part member 131.

The controller 132 may receive a signal from the sensor 147 and convert an output image.

For example, the controller 132 may detect a signal from the sensor 147 of the angle control body 146 and horizontally invert the captured image from the camera lens 133.

Specifically, vertical inversion of an image may be prevented in the learner's photographing mode by the photographing mode switching module 140, but the left and right sides of the image may be reversed when the image in the mirror is output. In this way, the issue of inversion may be addressed.

When only the learner's current state needs to be checked, left-right inversion of the image does not matter. However, left-right inversion of the image may be needed to accurately recognize the learner's or teacher's action.

Therefore, in one embodiment of the present disclosure, when it is confirmed that the learner photographing mode is set through mode switching, the captured image is horizontally inverted.

That is, when the sensor 147 of the angle control body 146 detects that the rotating body 141 is brought into contact with the angle control body 146, the sensor 147 sends a signal to the controller 132 to output a horizontally inverted image.

The hinge 148 is connected to one end of the rotating body 141.

In one embodiment of the present disclosure, the mode switch may be facilitated by adjusting the rotation resistance of the hinge 148 and the magnitude of the magnetic force of the magnet 143.

For example, the rotation shaft may be subjected to a high resistance at a specific angle such that the body is kept at the specific angle. In other words, the base is subjected to a small resistance and rotates easily until it reaches an angle. Then, when the base is within a specific angle range, the resistance of the rotation shaft may increase, and thus the base may not rotate easily.

As another example, the rotating body 141 may be configured to naturally move to the learner photographing mode position and be fixed when the user applies force to the rotating body 141 fixed at the study material photographing mode position.

To this end, the size and strength of the magnet 143 and the resistance of the hinge 148 may be adjusted.

That is, when the angle between the rotating body 141 and the floor is less than the right angle, the magnetic force may be controlled such that the magnet 143 and the magnetic plate 145 may attract the rotating body 141 and fix the same to the inclined surface. When the rotating body 141 is separated from the head part member 131, the resistance of the hinge 148 may be controlled such that the rotating body may rotate up to a position where the rotating body is perpendicular to the floor without external force.

Specifically, referring to FIG. 3, the rotating body 141 maintains an M1 position by the attractive force between the magnet 143 and the magnetic member 144. When the user pulls the rotating body 141 downward, the magnet 143 is separated from the magnetic member 144 and is moved out of a section in which the magnetic force is greater than the rotational force. By controlling the resistance of the hinge 148, the rotating body 141 may be rotated without any external force applied in section III. And in the section (section II) in which the rotating body 141 forms a smaller angle with the floor than in the vertical position, the rotating body 141 may be brought into contact with the angle control body 146 by attractive force or by controlling the intensity of the magnet 143.

Similarly, when the rotating body 141 maintains the M2 position by the attraction between the magnet 143 and the magnetic plate 145, the user may pull the rotating body 141 downward. Then, the magnet 143 and the magnetic plate 145 are separated from each other and the rotating body 141 is subjected to rotational force. By the inertia of the force applied to separate the magnet 143 and the magnetic plate 145, the rotating body 141 is rotated to section I. In section I, the rotating body is naturally fixed at the M1 position by magnetic force again.

That is, the user may change the mode simply by applying a force enough to release the fixed state of the rotating body 141 fixed at the M1 position or the M2 position.

Figure 5:
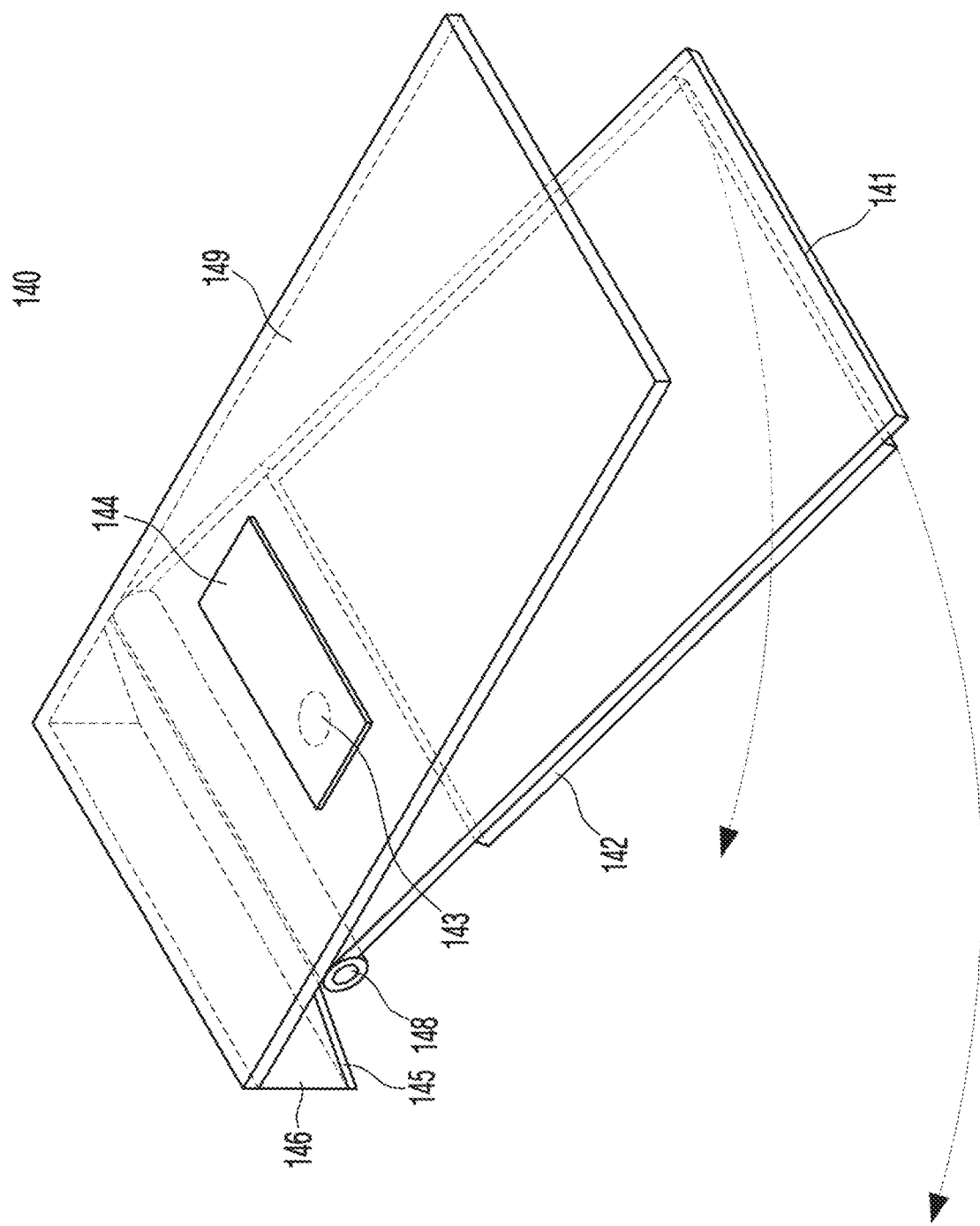
FIG. 5 is a conceptual view of a detachable photographing mode switching module according to another embodiment of the present disclosure.
Figure 6:
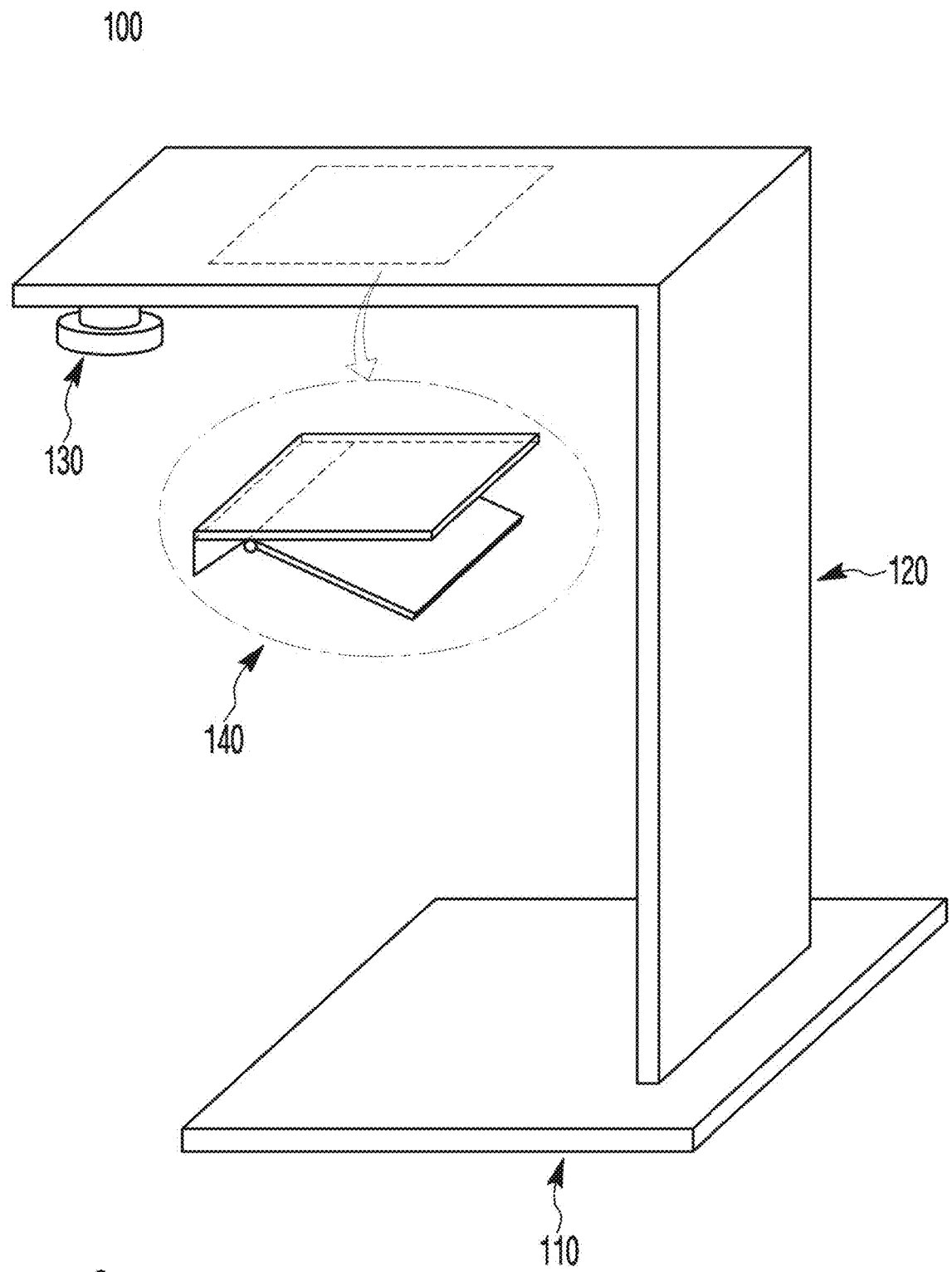
FIG. 6 is a conceptual view illustrating mounting of the detachable photographing mode switching module.

FIG. 5 is a conceptual view of a detachable photographing mode switching module 140 according to another embodiment of the present disclosure, and FIG. 6 is a conceptual view illustrating mounting of the detachable photographing mode switching module 140.

According to the other embodiment of the present disclosure, the photographing mode switching module 140 may be configured to be detachable rather than being secured to the visual presenter 100.

For example, as shown in the figure, the photographing mode switching module 140 may include a member 149 of the base 110 coupled to the head part member 131 of the visual presenter 100. The elements of the photographing mode switching module 140 described above may be coupled to the member 149 of the base 110.

Accordingly, the user may mount the photographing mode switching module 140 on the existing visual presenter 100, and easily switch the presenter between the learner photographing mode and the study material photographing mode.

The present disclosure may provide a visual presenter having a head structure capable of changing a photographing direction, the visual presenter including a base fixed to a floor by applying weight to prevent the presenter from falling down, a head part having one end provided with a camera lens facing the floor, a support part connecting the head part and the base and extending upward from the base to position the head part at a height of a learner's face, and a photographing mode switching module disposed adjacent to the camera lens and configured to switch between a learner photographing mode and a study material photographing mode without requiring manipulation of the head part. In order to match the position of the image formed on the camera lens with a corresponding real object without a separate program in switching the study material photographing mode and the learner photographing mode, the photographing mode switching module may include a rotating body configured to rotate between a study material photographing mode position and a learner photographing mode position, a reflective member disposed on a bottom surface of the rotating body, an angle control body configured to guide the rotating body to be fixed at the learner photographing mode position, a hinge arranged between the angle control body and the rotating body and defining a rotation axis of the rotating body. Herein, the rotating body closely contacts a head part member at the study material photographing mode position, and the rotating body overlaps a lower portion of the camera lens to form an image of an object disposed in front on the camera lens at the learner photographing mode position.

According to the embodiments of the present disclosure described above, a popular-type visual presenter capable of eliminating the need to embed separate software and having a simplified device structure that may be easily operated by young students such as elementary school students in low grades may be provided. When a reflective member is mounted on the bottom surface of the rotating body and positioned in a user photographing mode, the user's face may be photographed without being vertically inverted. The photographing mode switching module has an angle control body that is disposed on the side opposite to the rotating body with respect to the hinge and is inclined at a specific angle. Accordingly, the position of the rotating body may be fixed in the user photographing mode. In addition, the rotating body is equipped with a magnet. Accordingly, the position of the rotating body may be prevented from being changed by external force in each photographing mode, and the rotary body may be easily fixed at each photographing mode position even with small force, in contrast with the conventional technology.

The above-described visual presenter having a head structure capable of changing the photographing direction is not limited to the configuration and method of the above-described embodiments, and all or part of each embodiment may be selectively combined to make various modifications to the present disclosure.

The invention claimed is:

1. A visual presenter having a head structure capable of changing a photographing direction, the visual presenter comprising:
    a base fixed to a floor by applying weight to prevent the presenter from falling down;
    a head part having one end provided with a camera lens facing the floor;
    a support part connecting the head part and the base and extending upward from the base to position the head part at a height of a learner's face; and
    a photographing mode switching module disposed adjacent to the camera lens and configured to switch between a learner photographing mode and a study material photographing mode without requiring manipulation of the head part, wherein the photographing mode switching module comprises:
    a rotating body configured to rotate between a study material photographing mode position and a learner photographing mode position;
    a reflective member disposed on a bottom surface of the rotating body;
    an angle control body disposed between the rotating body and the camera lens and having an inclined surface supporting the rotating body such that the rotating body remains inclined at a predetermined angle from the camera lens at the learner photographing mode position; and
    a hinge arranged between the angle control body and the rotating body and defining a rotation axis of the rotating body;
    wherein the rotating body closely contacts a head part member at the study material photographing mode position; and wherein the rotating body overlaps a lower portion of the camera lens to form an image of an object disposed in front on the camera lens at the learner photographing mode position.

2. The visual presenter of claim 1, wherein the rotating body comprises a magnet disposed between the hinge and the reflective member,
   wherein the inclined surface comprises a magnetic plate configured to fix the rotating body at the learner photographing mode position when contacting the magnet,
   wherein the head part member comprises a magnetic member configured to fix the rotating body at the study material photographing mode position when contacting the magnet.

3. The visual presenter of claim 2, wherein the angle control body comprises: a sensor configured to detect contact between the rotating body and the inclined surface.

4. The visual presenter of claim 3, further comprising:
   a controller configured to control an operation of the camera lens,
   wherein the controller is configured to detect a signal from the sensor and horizontally invert a captured image from the camera lens.

5. The visual presenter of claim 4, wherein the sensor comprises a magnetic force sensor configured to detect a change in a magnitude of magnetic force formed between the magnet and the magnetic plate adjacent to each other.

6. The visual presenter of claim 4, wherein the sensor comprises:
   a pressure sensor configured to detect force applied by the magnet to the magnetic plate.

7. The visual presenter of claim 2, wherein the rotating body is naturally fixed at the learner photographing mode position when a user releases the rotating body from the study material photographing mode position.

8. The visual presenter of claim 7, wherein, when an angle between the rotating body and the floor is smaller than when the rotating body is positioned perpendicular to the floor, the magnetic force of the magnet and the magnetic plate is controlled to attract and fix the rotating body to the inclined surface,
   wherein, when the rotating body is separated from the head part member, resistance of the hinge is controlled such that the rotating body falls to a position perpendicular to the floor.

9. The visual presenter of claim 1, wherein the photographing mode switching module is detachably provided to the head part.

* * * * *